(12) United States Patent
Nagadome et al.

(10) Patent No.: US 9,775,301 B2
(45) Date of Patent: Oct. 3, 2017

(54) CULTIVATION SYSTEM

(71) Applicant: Panasonic Corporation, Osaka (JP)

(72) Inventors: Ryuji Nagadome, Osaka (JP); Hiroshi Haji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 218 days.

(21) Appl. No.: 14/375,149

(22) PCT Filed: Dec. 7, 2012

(86) PCT No.: PCT/JP2012/007852
§ 371 (c)(1),
(2) Date: Jul. 29, 2014

(87) PCT Pub. No.: WO2013/114500
PCT Pub. Date: Aug. 8, 2013

(65) Prior Publication Data
US 2015/0000191 A1    Jan. 1, 2015

(30) Foreign Application Priority Data

Feb. 2, 2012 (JP) ................................. 2012-021111
Feb. 2, 2012 (JP) ................................. 2012-021292

(51) Int. Cl.
*A01G 7/00* (2006.01)
*A01G 7/04* (2006.01)
(Continued)

(52) U.S. Cl.
CPC ............... *A01G 7/045* (2013.01); *A01G 7/00* (2013.01); *A01G 9/00* (2013.01); *A01G 9/26* (2013.01)

(58) Field of Classification Search
CPC . A01G 7/045; A01G 7/00; A01G 9/00; A01G 9/26
(Continued)

(56) References Cited

U.S. PATENT DOCUMENTS 3,876,907 A * 4/1975 Widmayer ............. A01G 7/045
                                                    315/149
5,841,883 A * 11/1998 Kono ...................... A01G 7/00
                                                    382/110
(Continued)

FOREIGN PATENT DOCUMENTS

CN    1658187     8/2005
JP    03-643      1/1991
(Continued)

OTHER PUBLICATIONS

Office Action issued Jul. 1, 2015 in corresponding Chinese Patent Application No. 201280068399.6 (with translation).
International Search Report issued Mar. 12, 2013 in International (PCT) Application No. PCT/JP2012/007852.

*Primary Examiner* — Marc Burgess
*Assistant Examiner* — Morgan T Barlow
(74) *Attorney, Agent, or Firm* — Wenderoth, Lind & Ponack, L.L.P.

(57) ABSTRACT

A cultivation system moves containers between a growing area and a monitoring area. The containers hold cultivation beds for cultivating plants, and the cultivation system includes: a grow light emitting unit emitting grow light for growing the cultivated plants in the containers located in the growing area; an imaging unit capturing the cultivated plants in the containers located in the monitoring area; and a control unit causing the grow light emitting unit to stop emitting the grow light when the imaging unit captures the plants.

10 Claims, 16 Drawing Sheets

(51) Int. Cl.
*A01G 9/26* (2006.01)
*A01G 9/00* (2006.01)

(58) Field of Classification Search
USPC .......................................... 47/66.6
See application file for complete search history.

(56) References Cited

U.S. PATENT DOCUMENTS

| | | |
|---|---|---|
| 7,499,573 B2 | 3/2009 | Tanabata et al. |
| 2005/0180608 A1 | 8/2005 | Tanabata et al. |
| 2006/0095949 A1* | 5/2006 | Whish-Wilson ... H04N 1/00204 725/105 |
| 2006/0102851 A1* | 5/2006 | Jalink ..................... B07C 5/342 250/461.2 |
| 2007/0289207 A1* | 12/2007 | May ........................ A01G 7/00 47/17 |
| 2010/0329536 A1* | 12/2010 | Muschler ............. G06K 9/0014 382/133 |

FOREIGN PATENT DOCUMENTS

| | | |
|---|---|---|
| JP | 2000253749 A * | 9/2000 |
| JP | 2004-81110 | 3/2004 |
| JP | 4276414 | 6/2009 |
| JP | 2010-57448 | 3/2010 |
| JP | 2011-125274 | 6/2011 |
| JP | 2011-177127 | 9/2011 |
| JP | 2012-183021 | 9/2012 |

* cited by examiner

CULTIVATION SYSTEM

TECHNICAL FIELD

The present invention relates to cultivation systems which move, as needed, and grow plants cultivated in movable containers and, in particular, to a cultivation system which allows a user to monitor cultivated plants.

BACKGROUND ART

Conventional agriculture for cultivating plants requires an aisle for people to move between plants in order to grow and harvest plants in soil. Hence techniques for such conventional agriculture based on soil culture have problems of low land-use efficiency and uneven growth among the plants depending on where the plants are planted.

Patent Literature 1 (PTL 1) exemplifies a technique to cultivate plants using containers holding cultivation beds such as water and soil, with the containers placed on a circulating conveyor. This allows intensive planting and harvesting at a single site and eliminates the need for aisles which a grower moves on, contributing to an increase in land-use efficiency.

The cultivation in the technique involves fertilization and irrigation carried out by cultivating apparatuses distributed at multiple locations above the conveyor used for circulating the containers.

In the above case of a so-called vegetable factory, plants would be grown using artificial light instead of sunlight. For example, some vegetable factories use LEDs which emit red light and blue light for growing their plants and encouraging the plants to photosynthesize and produce vitamin.

CITATION LIST

Patent Literature

[PTL 1]
Japanese Unexamined Utility Model Application Publication No. 03-000643

SUMMARY OF INVENTION

Technical Problem

In judging the growth degree of plants and the presence or absence of a plant disease in the above plant factories, some growers move the plants from a growing area to a monitoring area and capture images of the plants using an imaging unit which includes imaging devices such as CCD image sensors. If the red light and the blue light emitted in the growing area are leaked to the monitoring area and provided to plants to be monitored, however, the growers in some cases cannot monitor an appropriate color of the plants. Hence the growers could not judge the growth degree of the plants or the presence or absence of a plant disease.

The present invention is conceived in view of the above knowledge and aims to provide a cultivation system and a plant monitoring method for accurately monitoring a color of a plant even though the plant is monitored with an imaging unit.

Solution to Problem

In order to achieve the above aim, a cultivation system according to an implementation of the present invention moves containers between a growing area and a monitoring area. Here the containers hold cultivation beds for cultivating plants and the cultivation system includes: a grow light emitting unit which emit grow light that is light for growing the cultivated plants in the containers located in the growing area; an imaging unit which captures the cultivated plants in the containers located in the monitoring area; and an imaging light emitting unit which emits imaging light to the cultivated plants in the containers located in the monitoring area, the imaging light having a spectrum which differs from a spectrum included in the grow light.

Furthermore, the cultivation system may include a control unit which causes the grow light emitting unit to stop emitting the grow light when the imaging unit captures the plants.

When the imaging unit captures plants, such features make it possible to prevent the grow light, emitted to the growing area, from being emitted to a plant located in the monitoring area, and obtain an accurate color of the plant. Hence the monitoring person can accurately judge the growth degree and a disease of the plant.

Moreover, the grow light emitting unit may include: a first grow light emitting unit which emits the grow light to a part of the growing area which is close to the monitoring area; and a second grow light emitting unit which emits the grow light to a part of the growing area which is more distant from the monitoring area than from the first grow light emitting unit. The first grow light emitting unit may be capable of emitting and stopping the grow light independently of the second grow light emitting unit. The control unit may cause the first grow light emitting unit to stop emitting the grow light when the imaging unit captures the plants.

In the case where the monitoring person monitors plants for a long period of time, such features make it possible to emit at least the grow light to some of the plants located in the growing area. This contributes to reducing harmful effects, to the growth of the plants, caused by the monitoring of the plants.

In addition, the grow light emitting unit may include a light emitting diode (LED) as a light source of the grow light.

Such a feature makes it possible to grow plants using low power consumption.

Furthermore, the cultivation system may include a growth conveyor which is located in the growing area, the growth conveyor being capable of carrying and horizontally moving the containers; and a work conveyor which is located in the monitoring area and connected with an end of the growth conveyor, the work conveyor carrying the containers.

In addition, the cultivation system may include a light blocking unit which blocks the grow light to be emitted to a plant to be captured when the imaging unit captures the plant, the plant being included in the plants.

Furthermore, the light blocking unit may include: a light blocking shield which blocks the grow light; a moving unit which moves the light blocking shield; and a control unit which causes the moving unit to move the light blocking shield to (i) a position where the light blocking shield blocks the grow light when the imaging unit captures the plant, and (ii) a position out of a pathway for transporting the containers when the containers are moved.

Moreover, the light blocking unit may include light blocking shield which is fixed between the growing area and a light blocking area to block the grow light. The cultivation system may further includes a transporting unit which transports the containers to positions where the blocking shield blocks the grow light, when the imaging unit captures the plant.

Furthermore, the cultivation system may include a growth conveyor which is located in the growing area, the growth conveyor being capable of carrying and horizontally moving the containers; and a work conveyor which is located in the monitoring area and connected with an end of the growth conveyor, the work conveyor carrying the containers.

When the imaging unit captures plants, such features make it possible to prevent the grow light, emitted to the growing area, from being emitted to a plant located in the monitoring area, and obtain an accurate color of the plant. Hence the monitoring person can accurately judge the growth degree and a disease of the plant.

Advantageous Effects of Invention

The present invention makes it possible to accurately capture a color of a plant and appropriately judge the growth degree of the plant and the presence or absence of a plant disease.

DESCRIPTION OF EMBODIMENTS

Described next are a cultivation system and a plant monitoring method according to embodiments of the present invention, with reference to the drawings. It is noted that the embodiments below are examples of the cultivation system and the plant monitoring method of the present invention. Hence the scope of the present invention is defined by the language of claims with reference to the embodiments, and shall not be defined by the embodiments alone.

Embodiment 1

Figure 1:
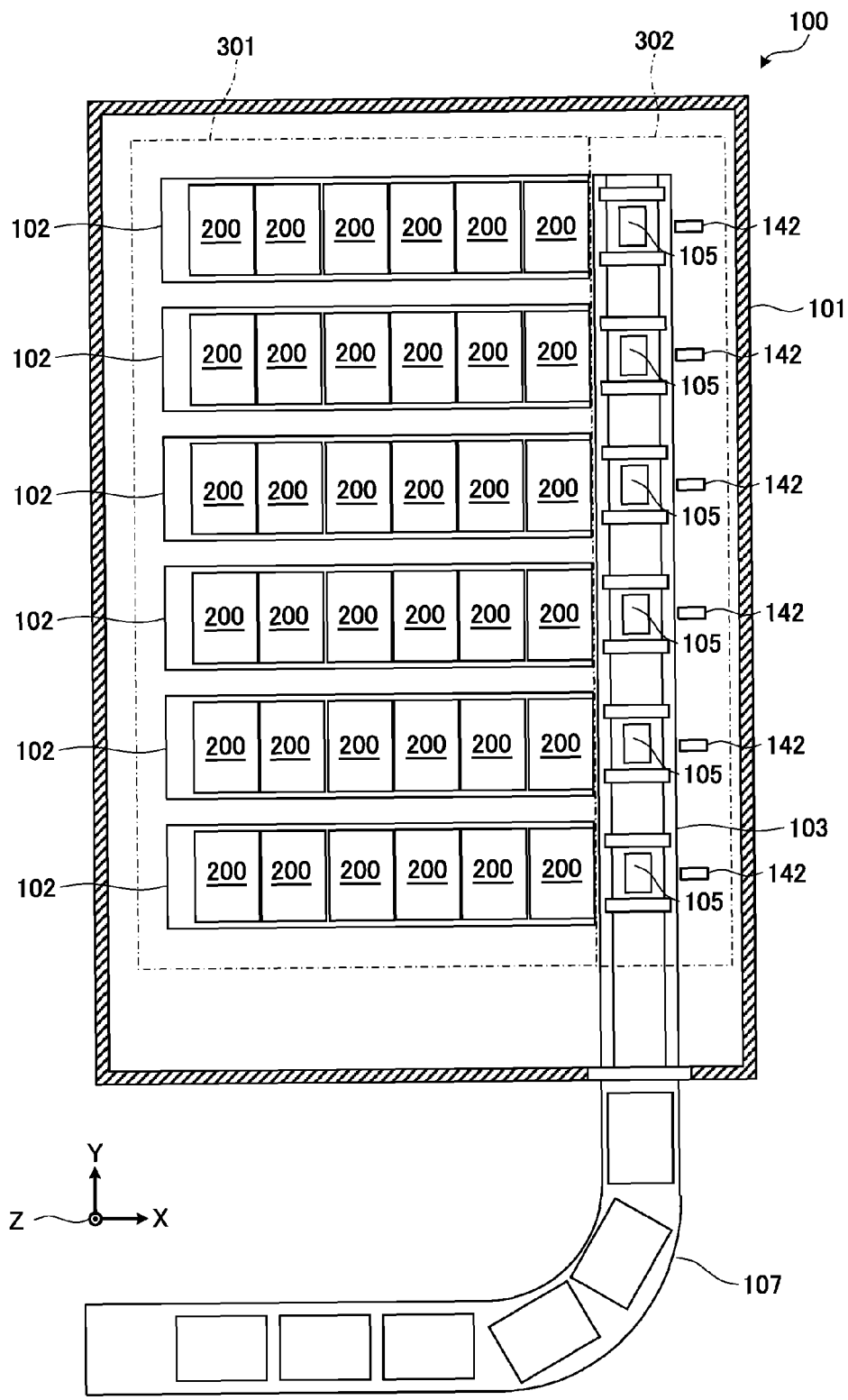
FIG. 1 is a plan view from the top, illustrating the entire picture of a cultivation system with a part thereof cut away.

FIG. 1 is a plan view from the top, illustrating the entire picture of a cultivation system with a part thereof cut away.

Figure 2:
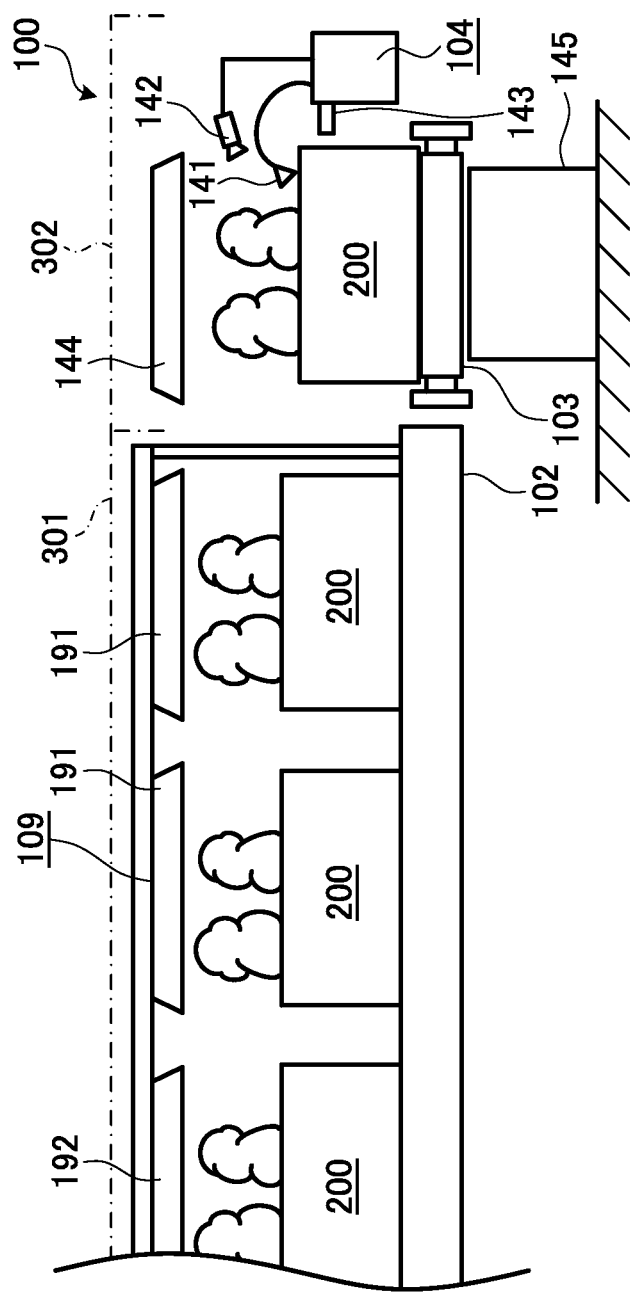
FIG. 2 represents a side view of a part of the cultivation system.

FIG. 2 represents a side view of a part of the cultivation system.

As represented in FIGS. 1 and 2, a cultivation system 100 moves multiple containers 200 between a growing area 301 and a monitoring area 302. Here the containers 200 hold cultivation beds for cultivating plants. The cultivation system 100 includes a grow light emitting unit 109, an imaging unit 142, and a control unit 105. In Embodiment 1, the cultivation system 100 further includes a growth conveyor 102, a work conveyor 103, an imaging light emitting unit 144, and a building 101.

The building 101 is a structure to separate the growing area 301 from the external environment and provide a stable environment to the growing area 301. In Embodiment 1, the building 101 includes the growing area 301 chiefly for growing plants and the monitoring area 302 for monitoring the plants. In Embodiment 1, the monitoring area 302 also works as a cultivating area for watering and fertilizing the plants. A cultivating unit 104 for cultivating the plants is located in the monitoring area 302.

The growth conveyor 102, located in the growing area 301, is capable of carrying and horizontally moving the containers 200. For example, the growth conveyor 102 may be a powered lineshaft roller conveyor and a powered belt conveyor.

In addition, there are two or more growth conveyors 102 located in the growing area 301. The multiple growth conveyors 102 are arranged in a direction (Y-axis direction in FIG. 1) intersecting with the direction in which the containers 200 move (X-axis direction); that is, the direction in which the growth conveyors 102 can transport the containers 200.

The work conveyor 103 is connected with an end of each growth conveyor 102, and carries the containers 200 located in the monitoring area 302. The work conveyor 103 is capable of transporting the carried containers 200. For example, the work conveyor 103 may be a powered lineshaft roller conveyor and a powered belt conveyor. Thus, in this respect, there is no difference between the work conveyor 103 and the growth conveyors 102.

In Embodiment 1, there is one work conveyor 103 located in the monitoring area 302. The work conveyor 103 moves in a direction (Y-axis direction) intersecting with the direction in which the growth conveyors 102 (X-axis direction) move. The work conveyor 103 is connected with an end of each of the multiple growth conveyors 102. It is noted that the cultivating unit 104 waters the plants above the work conveyor 103. Hence the work conveyor 103 is more water-resistant than the growth conveyors 102 are.

The grow light emitting unit 109 emits grow light which is light for growing plants cultivated in the containers 200 located in the growing area 301. In Embodiment 1, the grow light emitting unit 109 includes multiple LEDs (not shown) as light sources for the grow light. In addition, the grow light emitting unit 109 includes a first grow light emitting unit 191 and a second grow light emitting unit 192. The first grow light emitting unit 191 emits the grow light to a part of the growing area 301 which is close to the monitoring area 302. The second grow light emitting unit 192 emits the grow light to a part of the growing area 301 which is more distant from the first grow light emitting unit 191 than from the monitoring area 302. Although not shown in FIG. 2, in the growing area 301, the second grow light emitting unit 192 is located at a place other than the place where the first grow light emitting unit 191 is located.

In Embodiment 1, close to the monitoring area 302 is an area which stretches from the monitoring area 302 and accommodates approximately two of the containers 200. The area, however, shall not be limited to this. The area close to the monitoring area 302 may be the one where the grow light is not leaked to the monitoring area 302 when the emission of the grow light stops.

The first grow light emitting unit 191 is capable of emitting and stopping the grow light independently of the second grow light emitting unit 192. In Embodiment 1, each of the first grow light emitting unit 191 and the second grow light emitting unit 192 has a different power supply system. Each of the power supply systems independently supplies and stops power, which makes it possible to independently control irradiation of the grow light.

Here the grow light is a generic term for artificial light which is different from natural light (sunlight) and whose emission spectrum is selectable depending on the kind and the growth process of a plant. For example, a spectrum of the grow light is that of the natural light with a specific color component missing or deteriorating. In Embodiment 1, the grow light emitting unit 109 includes an LED which can emit red light and an LED which can emit blue light. The grow light emitting unit 109 has the LEDs arranged so that the entire plant cultivated in one container 200 is equally irradiated with red light and blue light at a predetermined proportion and each of the containers 200 located in the growing area 301 is irradiated with an equal amount of the light.

The imaging unit 142 is a camera for capturing plants cultivated in the containers 200 located in the monitoring area 302. In Embodiment 1, the imaging unit 142 is a camera including area image sensors such as CCD image sensors and CMOS image sensors, and located at the position where the plants can be monitored above the containers 200 placed on the work conveyor 103.

The imaging light emitting unit 144 emits imaging light, which is for capturing images, to plants cultivated in the containers 200 located in the monitoring area 302.

In Embodiment 1, the imaging light emitting unit 144 includes a light source which can artificially emit light whose spectrum is close to that of natural light (sunlight). The imaging light emitting unit 144 emits light whose spectrum is different from that of grow light.

It is noted that the imaging light emitting unit 144 may be an opening provided to the building 101 for taking natural light (sunlight) to the monitoring area 302.

Figure 3:
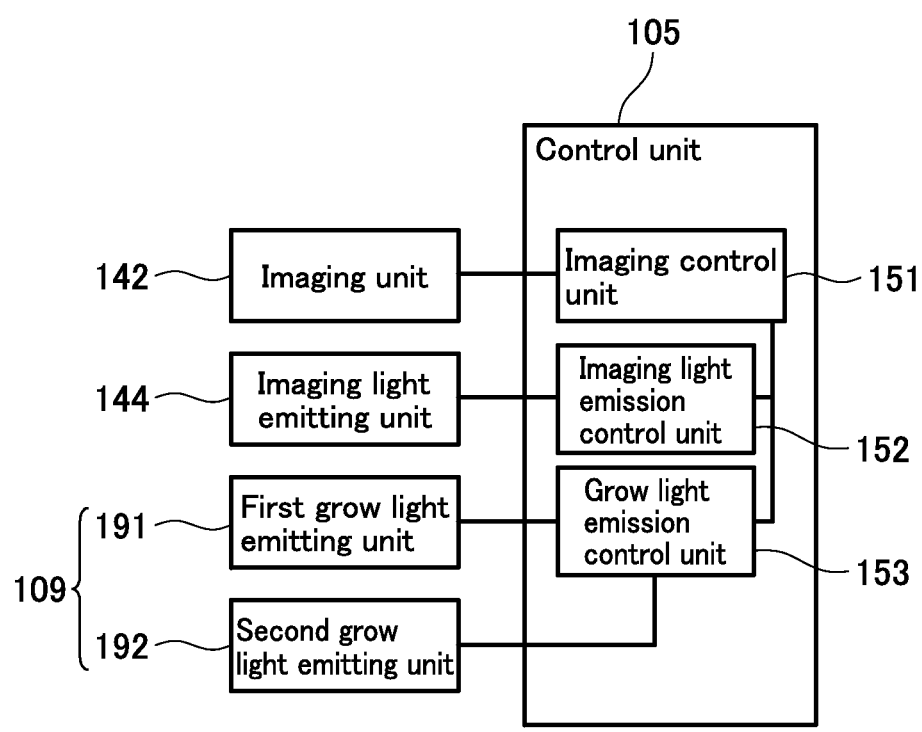
FIG. 3 represents a block diagram illustrating functional units included in a control unit along with a part of mechanism units.

FIG. 3 represents a block diagram illustrating functional units included in a control unit along with a part of mechanism units.

Figure 4:
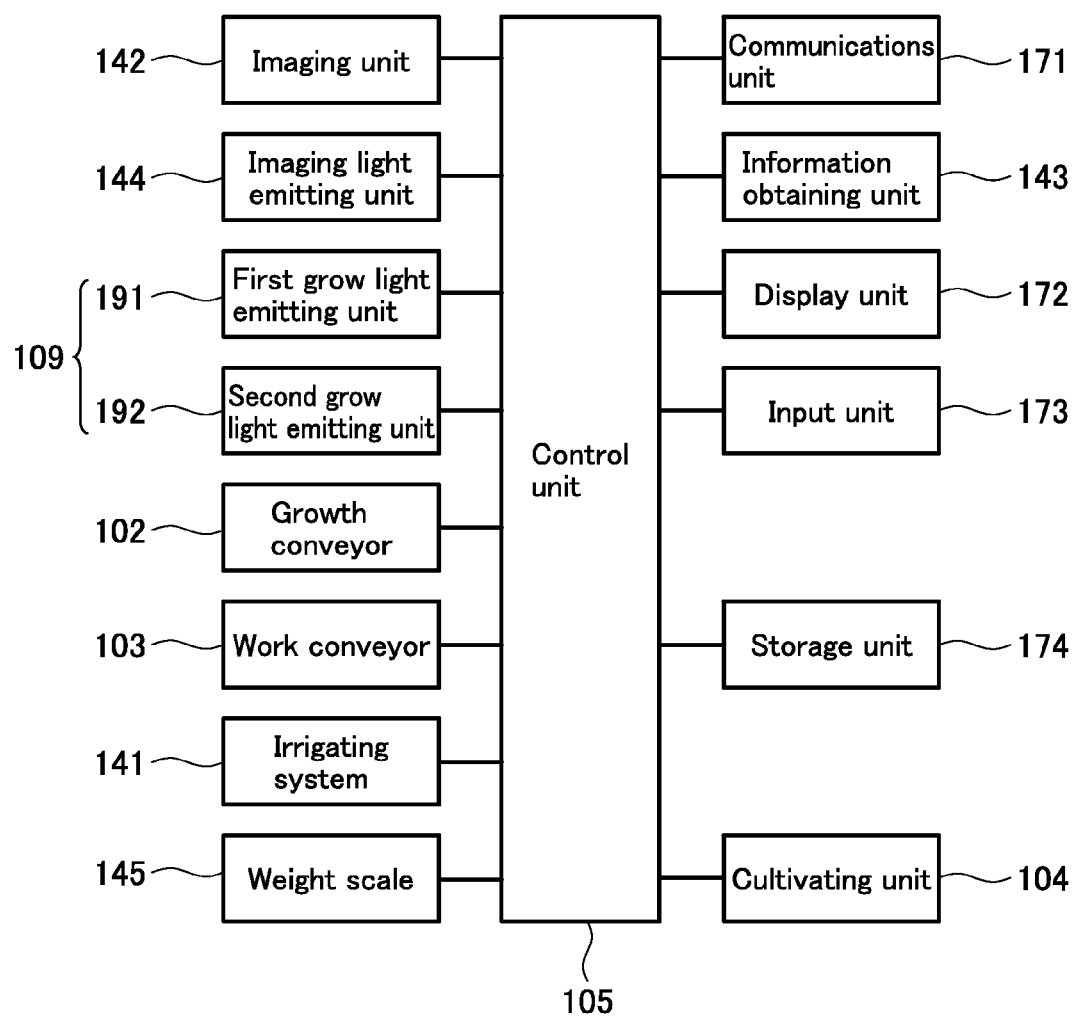
FIG. 4 represents a schematic view illustrating how the control unit and mechanism units are connected together.

FIG. 4 represents a schematic view illustrating how the control unit and mechanism units are connected together.

The control unit 105 is a computer to cause the grow light emitting unit 109 to stop emitting the grow light when the imaging unit 142 captures plants. The control unit 105 includes an imaging control unit 151, an imaging light emission control unit 152, and a grow light emission control unit 153.

For example, the imaging control unit 151 is a processing unit for causing the imaging unit 142 to capture images of the plants based on imaging direction information received via a communications unit 171 and imaging direction information inputted from an input unit 173, and obtaining the images from the imaging unit 142. In addition, the imaging control unit 151 causes a display unit 172 to display the obtained images and a storage unit 174 to store the images, the date of capturing the images, and identification information for the captured plants.

The imaging light emission control unit 152 is a processing unit to cause the imaging light emitting unit 144 to emit and stop imaging light. The imaging light emission control unit 152 is, for example, a processing unit for causing the imaging light emitting unit 144 to (i) emit the imaging light before the imaging unit 142 starts capturing plants, based on the obtained imaging direction information, and (ii) stop emitting the imaging light when obtaining information indicating that the imaging unit 142 has finished capturing the plants.

The grow light emission control unit 153 is a processing unit for causing the grow light emitting unit 109 to emit and stop the grow light. The grow light emission control unit 153 is, for example, a processing unit for causing the grow light emitting unit 109 to (i) stop emitting the grow light before the imaging unit 142 starts the imaging, based on the obtained imaging direction information, and (ii) resume emitting the grow light when the imaging unit 142 finishes imaging.

When the imaging unit 142 captures the plants, the above features contributes to blocking a leak of the grow light to the monitoring area 302 and accurately displaying the colors of the plants displayed on the display unit 172. Hence a monitoring person who watches the display unit 172 can accurately judge the growth degree of the plants and the presence or absence of a plant disease.

When the imaging unit 142 is capturing plants in Embodiment 1, the grow light emission control unit 153 causes the first grow light emitting unit 191 alone to stop emitting the grow light provided to the growing area 301 close to the monitoring area 302.

Hence, even though the imaging unit 142 is capturing plants, the second grow light emitting unit 192 can keep emitting the grow light to the plants. Such a feature contributes to minimizing harmful effects to the growth of the plants due to the capturing.

The cultivating unit 104 is capable of supplying substances required for cultivation to the containers 200 located on the work conveyor 103. In Embodiment 1, the cultivating unit 104 includes the following: an irrigating system 141 for watering and fertilizing (see FIG. 2); an information obtaining unit 143 for reading an identification information item provided to each of the containers 200 to identify the container 200; and a weight scale 145 for weighing the containers 200. Exemplary substances required for cultivation include agricultural chemicals and growth stimulant agents, as well as the water and the fertilizers.

In Embodiment 1, the cultivation system 100 further includes a carry-in and carry-out conveyor 107 (see FIG. 1).

The carry-in and carry-out conveyor 107 carries the containers 200 in and out of the building 101. The carry-in and carry-out conveyor 107 is set in the building 101 toward its outside, moves in the same direction at which the work conveyor 103 moves, and is connected to an end of the work conveyor 103.

The carry-in and carry-out conveyor 107 allows people to handle warehousing and shipping of the plants outside the building 101, which contributes to reducing frequent comings and goings of people into and out of the building 101 and providing a stable environment to the building 101.

Described next is how to monitor plants with the cultivation system 100.

Figure 5:
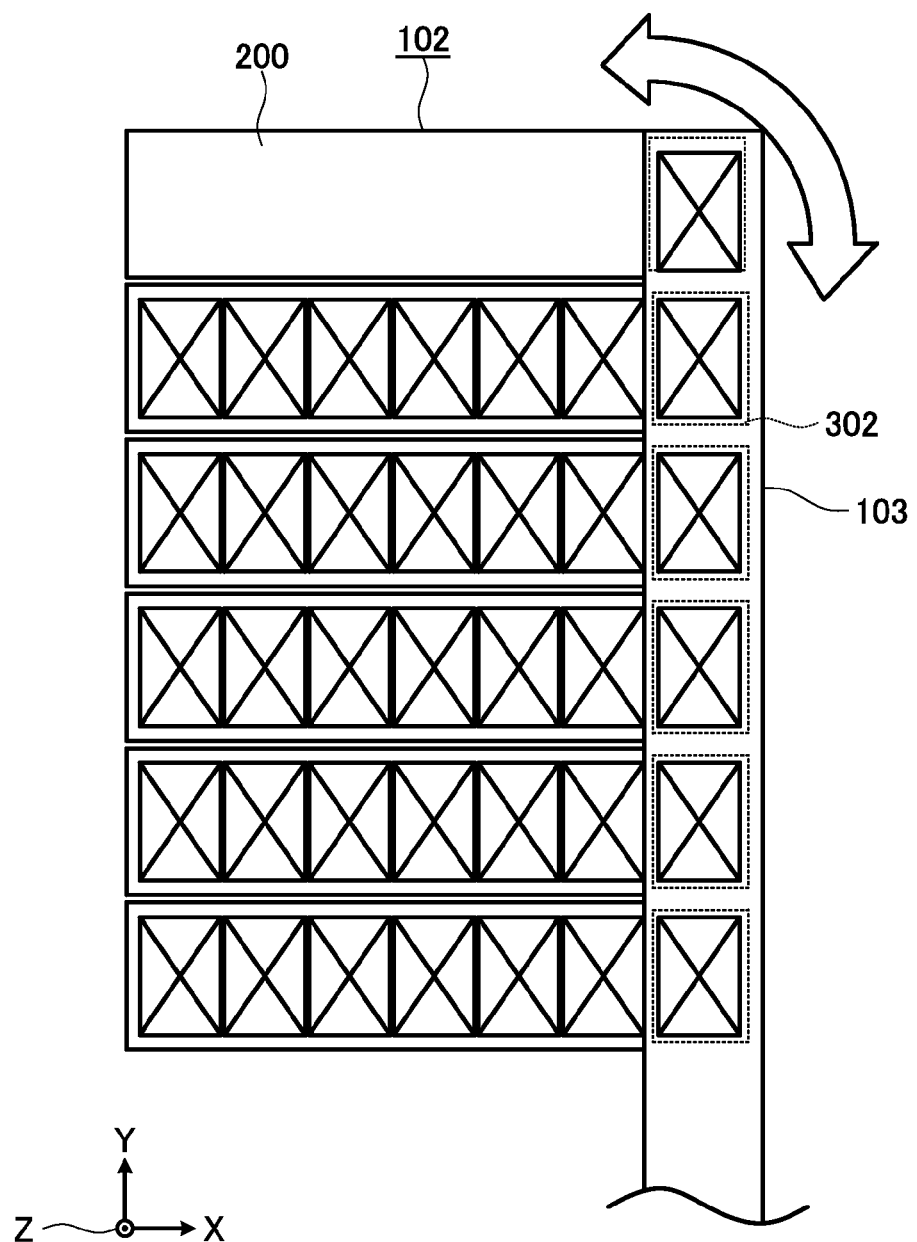
FIG. 5 represents a plan view illustrating a part of a container located in a monitoring area.

The control unit 105 for controlling the entire cultivation system 100 to cause the growth conveyor 102 and the work conveyor 103 to sequentially move containers 200 to the monitoring area 302 as illustrated in FIG. 5. A monitoring person starts monitoring the plants when each of the containers 200 is placed to a position corresponding to one of the imaging units 142 arranged on a side of the work conveyor 103.

When obtaining the imaging direction information, the control unit 105 (the first grow light emitting unit 191 in Embodiment 1) turns off the grow light emitting unit 109 and turns on the imaging light emitting unit 144.

Next, the control unit 105 causes the imaging unit 142 to capture images inside the containers 200, and obtain each of the images. The obtained images are displayed on the display unit 172. Here the screen displays the images of the plants obtained with no grow light leaked thereto. Hence the monitoring person can accurately understand the growth degree of the plants and the presence or absence of a plant disease.

When the monitoring ends, the control unit 105 causes the cultivating unit 104 to carry out cultivation such as irrigation. Here the control unit 105 allows the monitoring person to accurately understand the condition of the plants. Hence, when the monitoring person judges that there are some plants which grow insufficiently, he or she can individually provide the plants with fertilizers in different amount and quality. When the monitoring person judges that there are some plants which suffer from a disease, he or she can individually provide a medicine which works for the disease.

When the monitoring and cultivation end, the control unit 105 places the containers 200 back to the growth conveyor 102, and carries out the same operations for containers 200 placed on a different growth conveyor 102.

Consequently, the monitoring person can monitor and cultivate the plants grown in all the containers 200 located in the growing area 301.

It is noted that the present invention shall not be limited to Embodiment 1. For example, any given combination of the constituent elements or omission of some of the constituent elements described in the specification may be appreciated to implement an embodiment of the present invention other than the above described embodiment. In addition, the present invention may include modifications implemented by a person skilled in the art to the embodiments unless otherwise departing from the subject-matter of the present invention; that is the scope of the invention stated with the language in claims.

Figure 6:
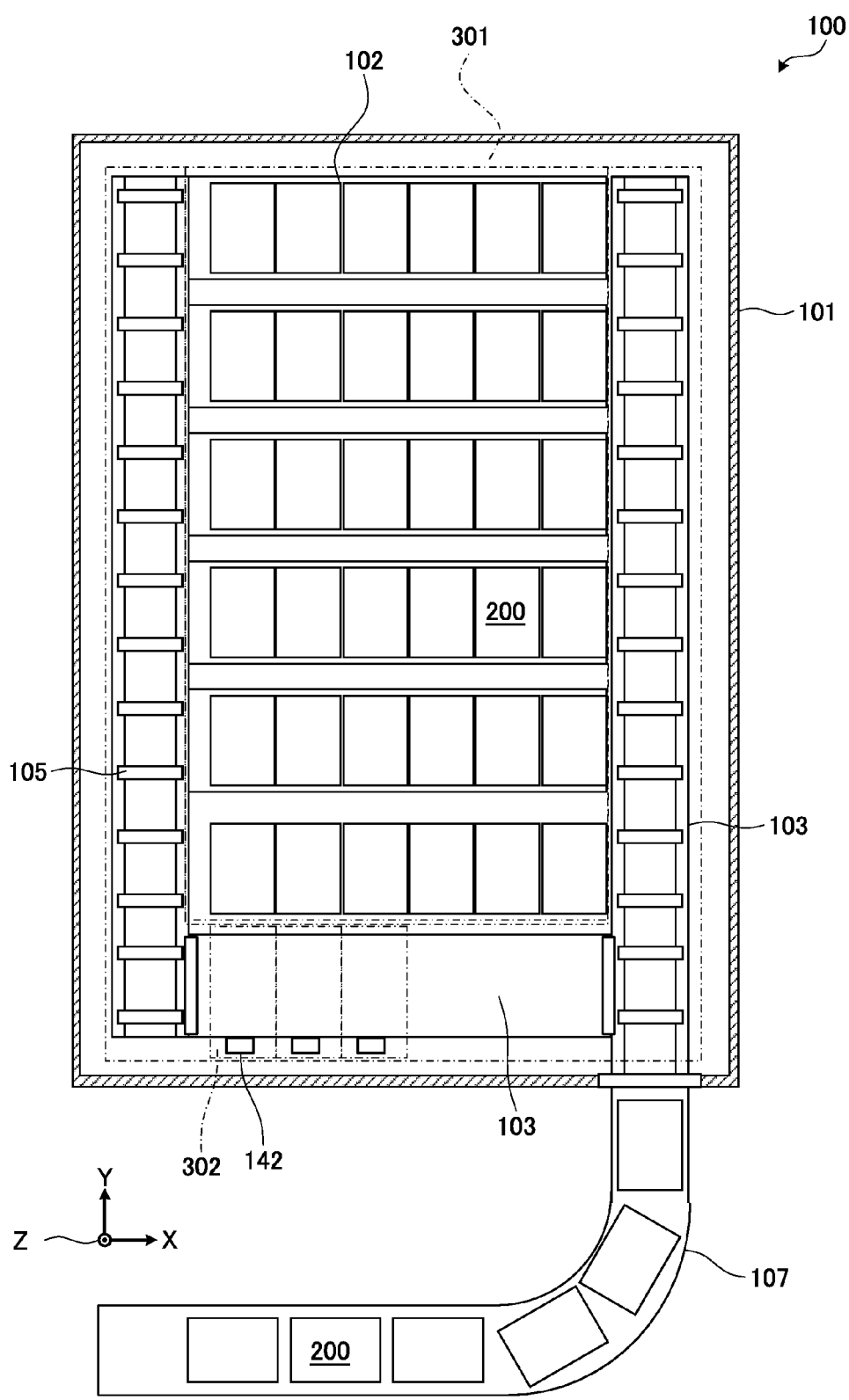
FIG. 6 represents a plan view from the top, illustrating the entire picture of a cultivation system according to another implementation of the embodiment with a part thereof cut away.

For example, the growth conveyor 102 and the work conveyor 103 may be laid out to shuttle back and forth as represented in FIG. 1 or to circulate as represented in FIG. 6.

Specifically, the work conveyor 103 for a circular cultivation system 100 is connected with the both ends of each of the growth conveyors 102. The work conveyor 103 is provided in a horseshoe shape, and each of the growth conveyors 102 is provided to tie both rows of the work conveyor 103 together like a bridge. Such a structure allows the growth conveyors 102 and the work conveyor 103 to form a pathway to circulate the containers 200. Hence the cultivation system 100 has as many circulation pathways as the number of the growth conveyors 102 for circulating the containers 200.

The above-described circular cultivation system 100 makes it possible to monitor the plants in all the containers 200 using at least one imaging unit 142 in the monitoring area 302.

Moreover, the containers 200 and the cultivation beds shall not be defined in a specific form. The containers 200 may be made of any given material including plastic, wood, and metal. The cultivation beds held in the containers 200 may be prepared using any given substance such as liquid for water culture, soil for soil culture, or a substitute for soil. In addition, things such as shallow pallets may be included in the containers 200.

Furthermore, the monitoring area 302 and a cultivating area for cultivation may be separately arranged from each other.

Embodiment 2

Described next are a cultivation system and a plant monitoring method according to another embodiment of the present invention with reference to the drawings.

Figure 7:
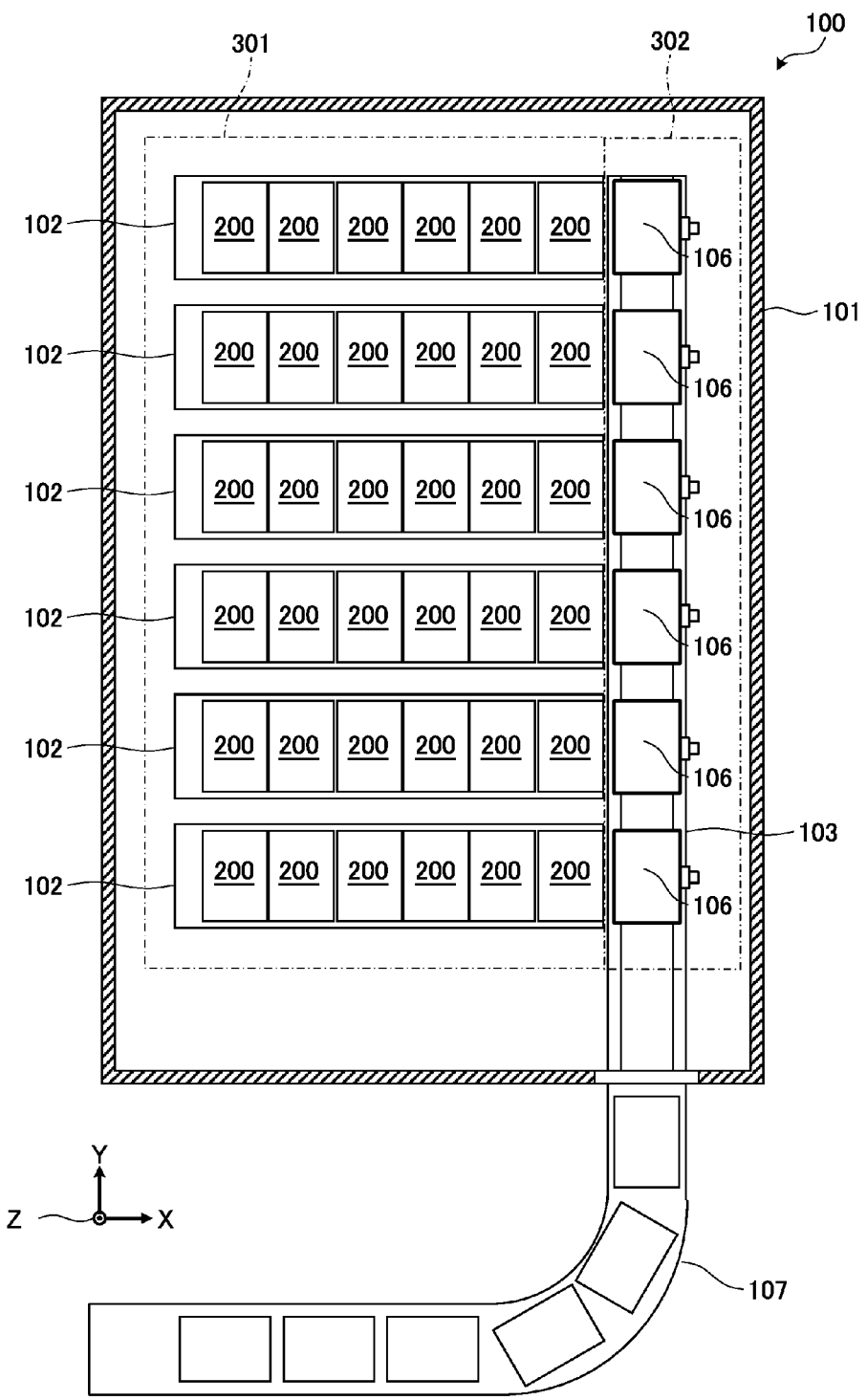
FIG. 7 represents a plan view from the top, illustrating the entire picture of a cultivation system with a part thereof cut away.

FIG. 7 represents a plan view from the top, illustrating the entire picture of a cultivation system with a part thereof cut away.

Figure 8:
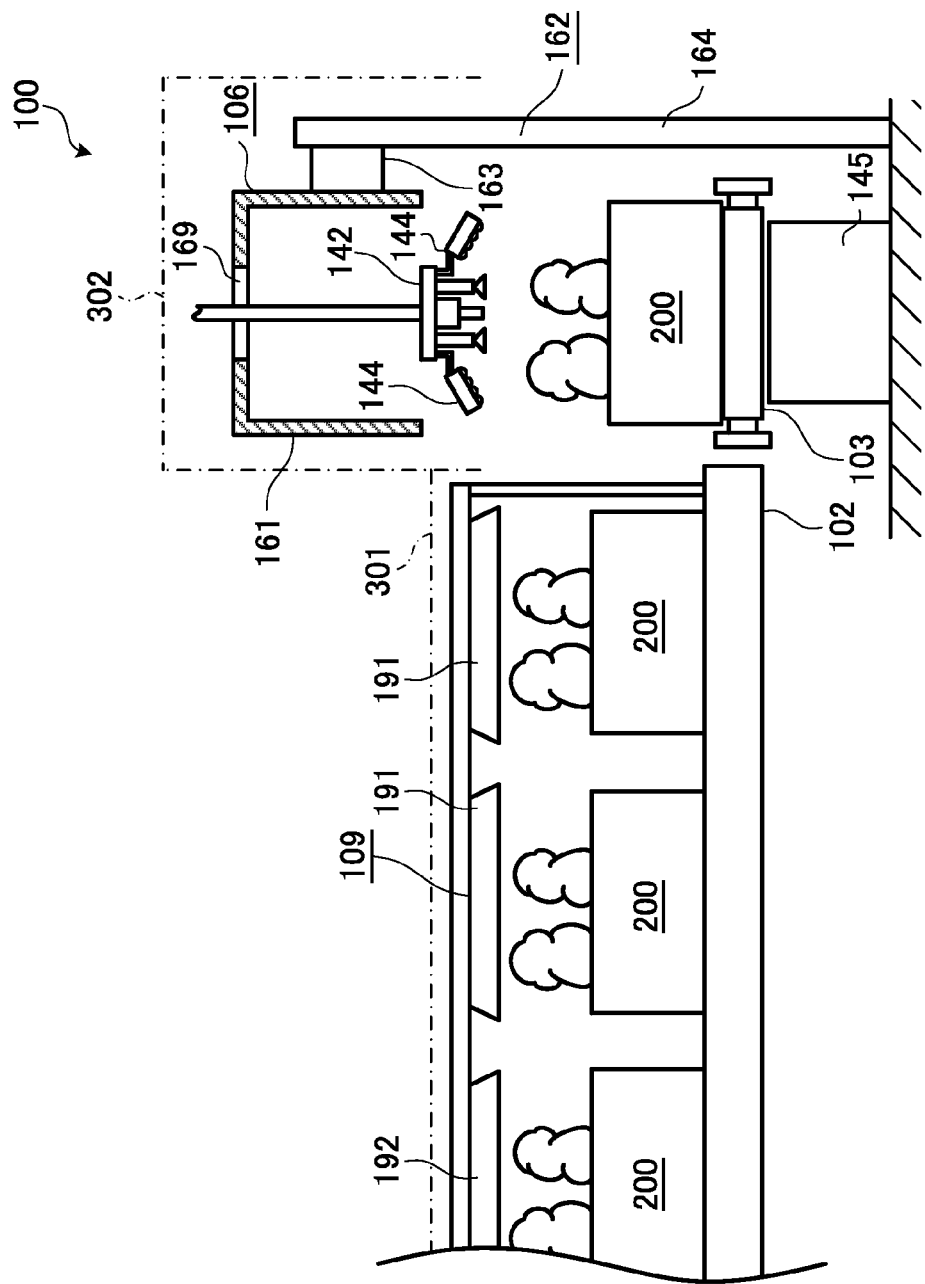
FIG. 8 represents a side view of a part of the cultivation system in transporting a container.

FIG. 8 represents a side view of a part of the cultivation system in transporting a container.

Figure 9:
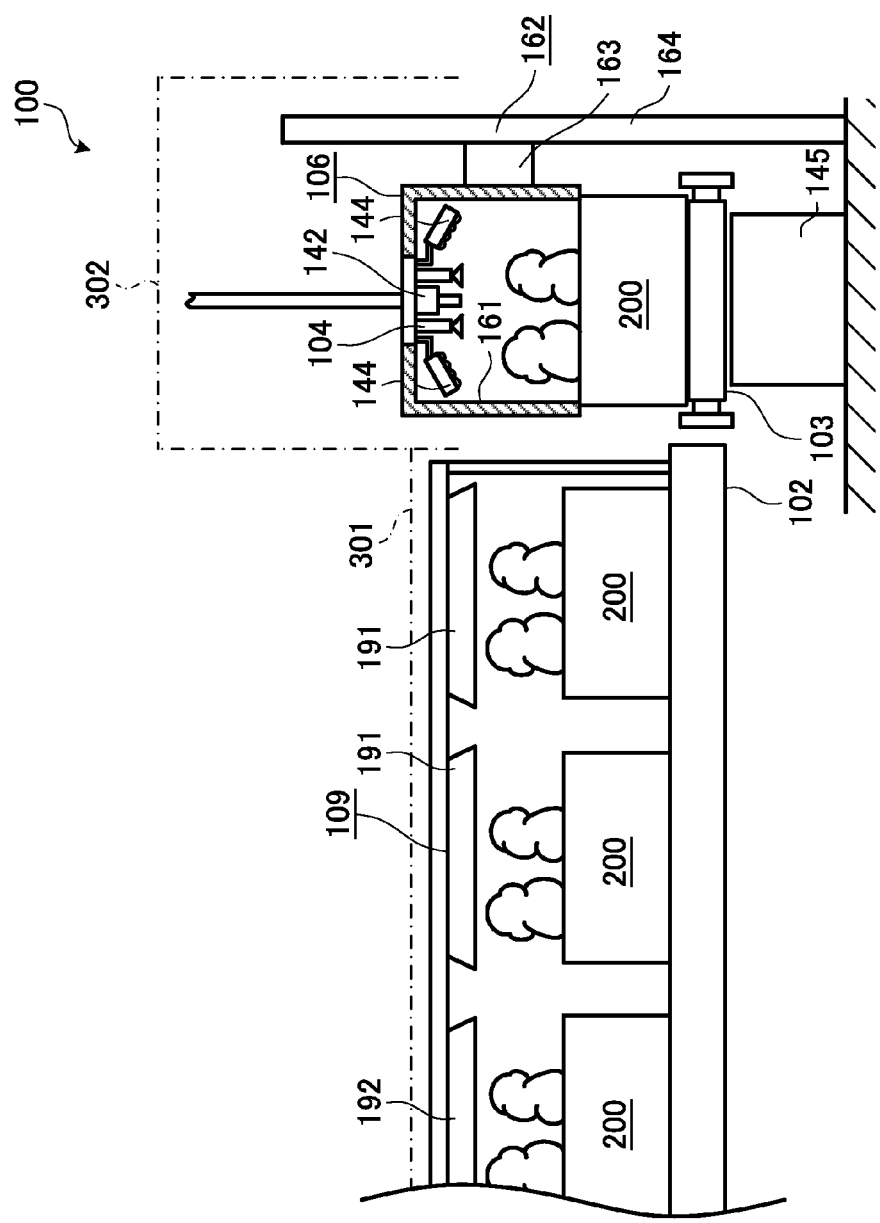
FIG. 9 represents a side view of a part of the cultivation system obtaining an image.

FIG. 9 represents a side view of a part of the cultivation system obtaining an image.

As represented in FIGS. 7 to 9, the cultivation system 100 moves the containers 200 between the growing area 301 and the monitoring area 302. Here the containers 200 hold cultivation beds for cultivating plants. The cultivation system 100 includes the grow light emitting unit 109, the imaging unit 142, and a light blocking unit 106. In Embodiment 2, the cultivation system 100 further includes the growth conveyor 102, the work conveyor 103, the imaging light emitting unit 144, and the building 101.

The building 101 is a structure to separate the growing area 301 from the external environment and provide a stable environment to the growing area 301. In Embodiment 2, the building 101 includes the growing area 301 chiefly for growing plants and the monitoring area 302 for monitoring the plants. In Embodiment 2, the monitoring area 302 also works as a cultivating area for watering and fertilizing the plants. A cultivating unit (not shown) for cultivating the plants is located in the monitoring area 302.

The growth conveyor 102, located in the growing area 301, is capable of carrying the containers 200 and horizontally moving the carried containers 200. For example, the growth conveyor 102 may be a powered lineshaft roller conveyor and a powered belt conveyor.

In addition, there are two or more growth conveyors 102 located in the growing area 301. The multiple growth conveyors 102 are arranged in a direction (Y-axis direction in FIG. 7) intersecting with the direction in which the containers 200 move (X-axis direction); that is, the direction in which the growth conveyors 102 can transport the containers 200.

The work conveyor 103 is connected with an end of each growth conveyor 102, and carries the containers 200 located in the monitoring area 302. The work conveyor 103 is capable of transporting the carried containers 200. For example, the work conveyor 103 may be a powered lineshaft roller conveyor and a powered belt conveyor. Thus, in this respect, there is no difference between the work conveyor 103 and the growth conveyors 102.

In Embodiment 2, there is one work conveyor 103 located in the monitoring area 302. The work conveyor 103 moves in a direction (Y-axis direction) intersecting with the direction in which the growth conveyors 102 (X-axis direction) move. The work conveyor 103 is connected with an end of each of the multiple growth conveyors 102. It is noted that the cultivating unit 104 waters the plants above the work conveyor 103. Hence the work conveyor 103 is more water-resistant than the growth conveyors 102 are.

The grow light emitting unit 109 emits grow light which is light for growing plants cultivated in the containers 200 located in the growing area 301. In Embodiment 2, the grow light emitting unit 109 includes multiple LEDs (not shown) as light sources for the grow light. Although not shown in FIG. 8, the grow light emitting unit 109 is provided over the entire growing area 301.

Here the grow light is a generic term for artificial light which is different from natural light (sunlight) and whose emission spectrum is selectable depending on the kind and the growth process of a plant. For example, a spectrum of the grow light is that of the natural light with a specific color component missing or deteriorating. In Embodiment 2, the grow light emitting unit 109 includes an LED which can emit red light and an LED which can emit blue light. The grow light emitting unit 109 has the LEDs arranged so that the entire plant cultivated in one container 200 is equally irradiated with red light and blue light at a predetermined proportion and each of the containers 200 located in the growing area 301 is irradiated with an equal amount of the light.

The imaging unit 142 is a camera for capturing plants cultivated in the containers 200 located in the monitoring area 302. In Embodiment 2, the imaging unit 142 is a camera including area image sensors such as CCD image sensors and CMOS image sensors.

The imaging light emitting unit 144 emits imaging light, which is for capturing images, to plants cultivated in the containers 200 located in the monitoring area 302.

In Embodiment 2, the imaging light emitting unit 144 includes a light source which can artificially emit light whose spectrum is close to that of natural light (sunlight). The imaging light emitting unit 144 emits light whose spectrum is different from that of grow light.

It is noted that the imaging light emitting unit 144 may be an opening or a skylight provided to the building 101 for taking natural light (sunlight) to the monitoring area 302.

When the imaging unit 142 captures a plant, the light blocking unit 106 blocks the grow light emitted to the plant to be captured. In Embodiment 2, the light blocking unit 106 includes a light blocking shield 161, a moving unit 162, and the control unit 105.

The light blocking shield 161 blocks grow light emitted from the grow light emitting unit 109. In Embodiment 2, the light blocking shield 161, a rectangular having an opening on the bottom, is made of material (such as aluminum plate) which allows almost no transmission of the grow light.

In addition, the light blocking shield 161 has an insertion hole 169 on the top. The insertion hole 169 allows the light blocking shield 161 to be located around the imaging unit 142 and the imaging light emitting unit 144 that are fixed. The insertion hole 169 also allows the light blocking shield 161 to move vertically. In imaging, such features allow the insertion hole 169 and the light blocking shield 161 to fit together to prevent grow light from entering into the light blocking shield 161, and allow the light blocking shield 161 to ascend when a container 200 is moved. This can always keep the container 200 and the imaging unit 142 in a constant positional relationship (relationship in height), which allows a monitoring person to stably monitor the growth degree of the plants.

It is noted that, in Embodiment 2, the imaging unit 142 has the cultivating unit 104, including an irrigation nozzle, attached the side thereof. When the cultivating unit 104 sprays water and so on, the light blocking shield 161 works as a cover which descends and encloses the cultivating unit 104 in order to prevent the water and so on from splattering out of a container 200. Hence the light blocking shield 161 is formed of a light-blocking and water-resistant material.

The moving unit 162 moves the light blocking shield 161. In Embodiment 2, the moving unit 162 is mounted on a base, and includes a pillar 164 which stands vertically, and a carriage 163 which moves vertically along with the pillar 164. For example, the carriage 163 is driven along with the pillar by pneumatic pressure and an electric motor. The light blocking shield 161 is attached to the carriage 163, and vertically movable along with the movement of the carriage 163.

Figure 10:
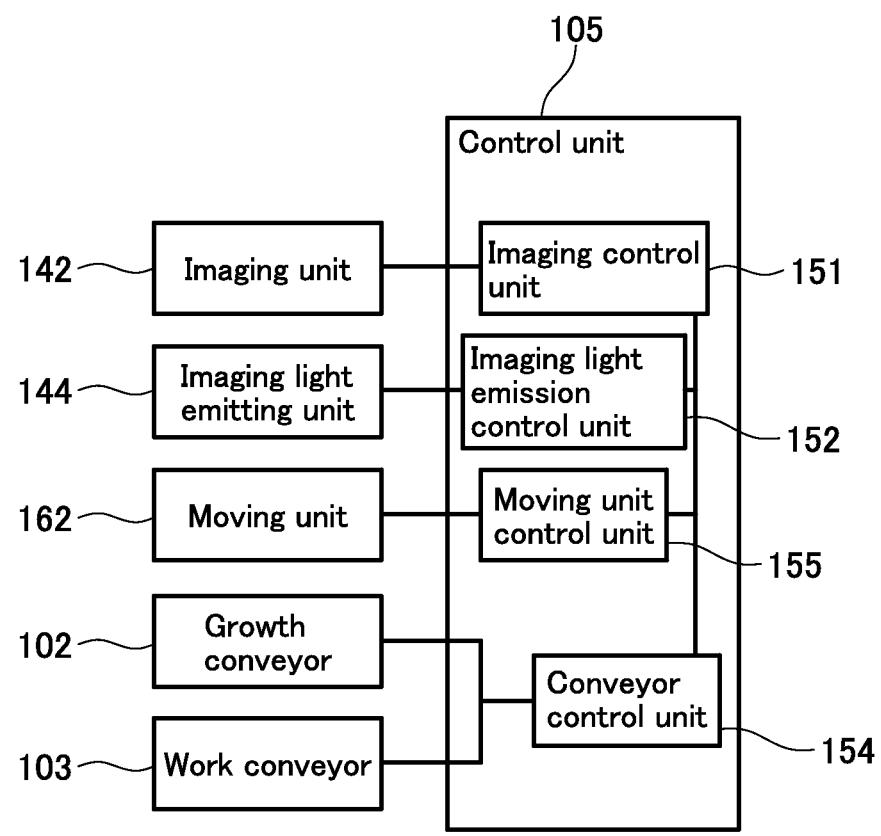
FIG. 10 represents a block diagram illustrating functional units included in a control unit along with a part of mechanism units.

FIG. 10 represents a block diagram illustrating functional units included in a control unit along with a part of mechanism units.

Figure 11:
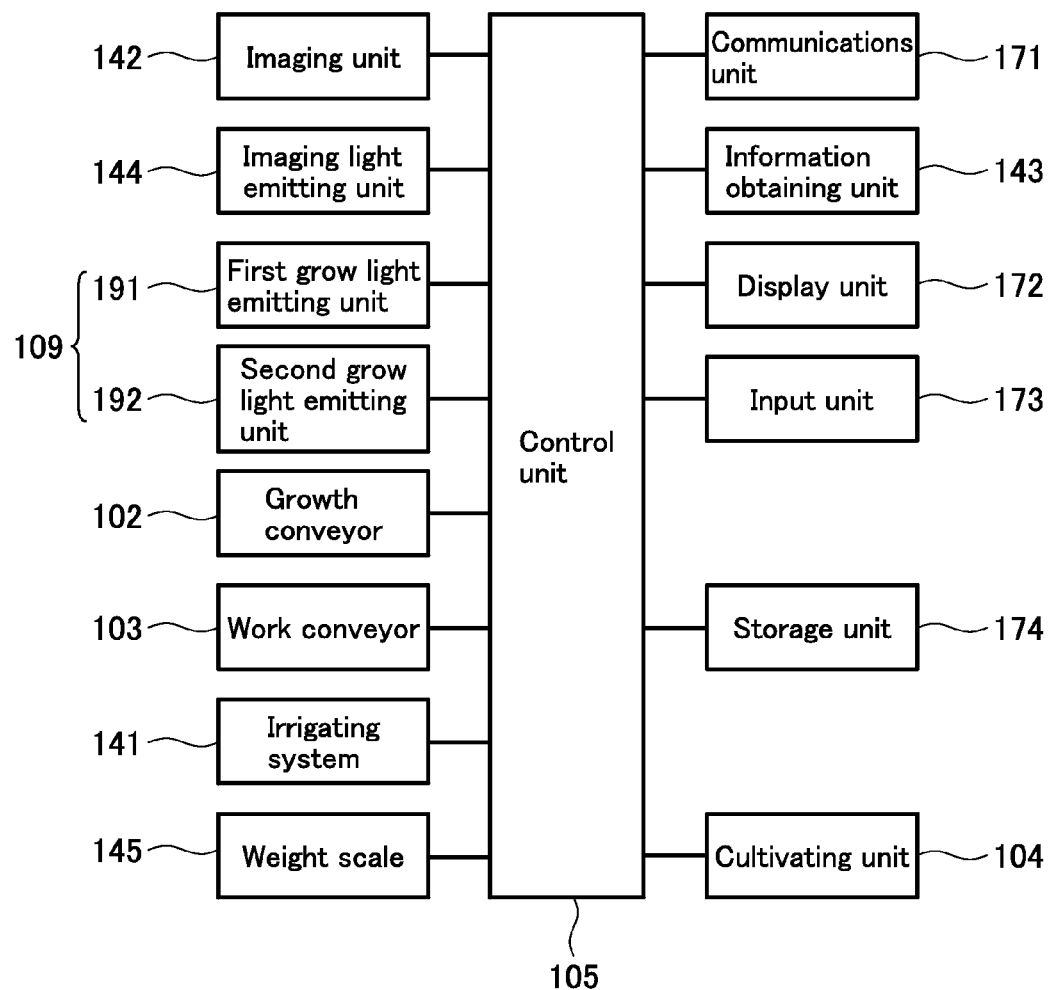
FIG. 11 represents a schematic view illustrating how the control unit and mechanism units are connected together.

FIG. 11 represents a schematic view illustrating how the control unit and mechanism units are connected together.

The control unit 105 is a computer to cause the moving unit 162 to move the light blocking shield 161 to (i) a position where the light blocking shield 161 blocks the grow light when the imaging unit 142 captures a plant, and (ii) another position out of a pathway for transporting the containers 200 when the containers are 200 moved. The control unit 105 includes the imaging control unit 151, the imaging light emission control unit 152, a moving unit control unit 155, and a conveyor control unit 154.

For example, the imaging control unit 151 is a processing unit for causing the imaging unit 142 to capture images of the plants based on imaging direction information received via a communications unit 171 and imaging direction information inputted from an input unit 173, and obtaining the images from the imaging unit 142. In addition, the imaging control unit 151 causes a display unit 172 to display the obtained images and a storage unit 174 to store the images, the date of capturing the images, and identification information for the captured plants.

The imaging light emission control unit 152 is a processing unit to cause the imaging light emitting unit 144 to emit and stop imaging light. The imaging light emission control unit 152 is, for example, a processing unit for causing the imaging light emitting unit 144 to (i) emit the imaging light before the imaging unit 142 starts capturing plants, based on the obtained imaging direction information, and (ii) stop emitting the imaging light when obtaining information indicates that the imaging unit 142 has finished capturing the plants.

When the imaging unit 142 captures a plant, the moving unit control unit 155 causes the moving unit 162 to move the carriage 163 down until the light blocking shield 161 covers the plant cultivated in a container 200, so that the plant is not irradiated with grow light. In contrast, when the carriage 163 ascends to a position where the entire light blocking shield 161 is moved out of the pathway for transporting the container 200, the moving unit control unit 155 transmits to the conveyor control unit 154 a driving allowance signal to allow the growth conveyor 102 and the work conveyor 103 to drive.

While holding the driving allowance signal, the conveyor control unit 154 causes the growth conveyor 102 and the work conveyor 103 to transport the container 200 to a predetermined place.

As described above, when the imaging unit 142 captures a plant, the plant is kept from being irradiated with the grow light in the monitoring area 302. This makes it possible to accurately display the color of the plant presented on the display unit 172. Hence the monitoring person watching the display unit 172 can accurately judge the growth degree of the plants and the presence or absence of a plant disease.

In Embodiment 2, the cultivation system 100 further includes a cultivating unit (not shown) and the carry-in and carry-out conveyor 107 (see FIG. 7).

The cultivating unit is capable of supplying substances required for cultivation to the containers 200 located on the work conveyor 103. In Embodiment 2, the cultivating unit includes the following: an irrigating system for watering and fertilizing; an information obtaining unit for reading an identification information item provided to each of the containers 200 to identify the container 200; and a weight scale for weighing the containers 200. Exemplary substances required for cultivation include agricultural chemicals and growth stimulant agents, as well as the water and the fertilizers.

The carry-in and carry-out conveyor 107 carries the containers 200 in and out of the building 101. The carry-in and carry-out conveyor 107 is set in the building 101 toward its outside, moves in the same direction at which the work conveyor 103 moves, and is connected to an end of the work conveyor 103.

The carry-in and carry-out conveyor 107 allows people to handle warehousing and shipping of the plants outside the building 101, which contributes to reducing frequent comings and goings of people into and out of the building 101 to provide a stable environment to the building 101.

Described next is how to monitor plants with the cultivation system 100.

Figure 12:
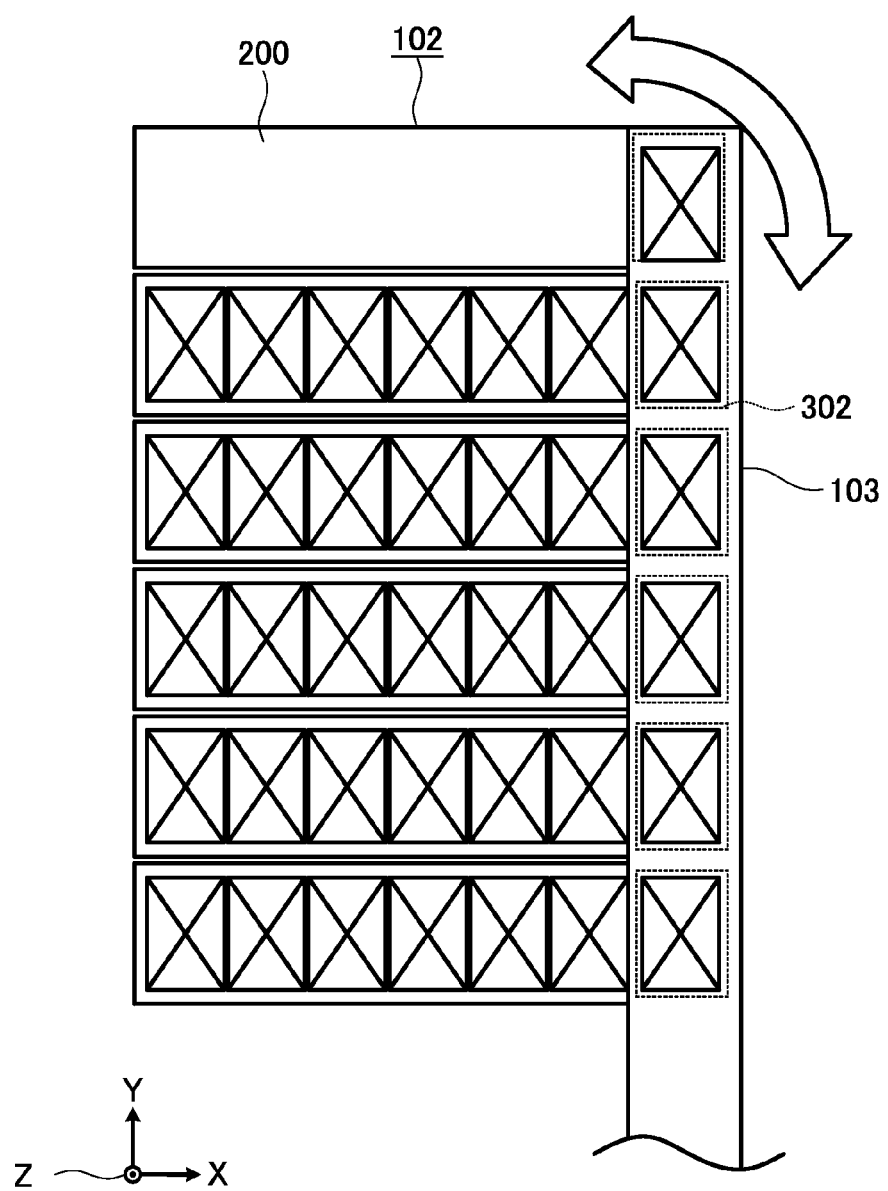
FIG. 12 represents a plan view illustrating a part of a container located in a monitoring area.

The control unit 105 for controlling the entire cultivation system 100 causes the growth conveyor 102 and the work conveyor 103 to sequentially move containers 200 to the monitoring area 302 as illustrated in FIG. 12. While the containers are moving, the carriage 163 ascends to the highest position.

When a container 200 is located at a predetermined position on the work conveyor 103, the moving unit control unit 155 controls the moving unit 162, so that moving unit 162 causes the light blocking shield 161 to cover the top of the containers 200 and the carriage 163 to descend to the lowest position so that the plant is kept from being irradiated with grow light.

Next, the imaging light emission control unit 152 turns on an imaging light emitting unit 144 provided inside each light blocking shield 161.

Next, the control unit 105 causes the imaging unit 142, provided inside each light blocking shield 161, to capture images inside the containers 200, and obtain each of the images. The obtained images are displayed on the display unit 172. Here the screen displays the images of the plants obtained with no grow light leaked to. Hence a monitoring person can accurately understand the growth degree of the plants and the presence or absence of a plant disease.

When the monitoring ends, the control unit 105 may cause the cultivating unit to carry out cultivation such as irrigation. Here the control unit 105 allows the monitoring person to accurately understand the condition of the plants. Hence, when the monitoring person judges that there are some plants which grow insufficiently, he or she can individually provide the plants with fertilizers in different amount and quality. When the monitoring person judges that there are some plants which suffer from a disease, he or she can individually provide a medicine which works for the disease.

When the monitoring and cultivation end, the light blocking unit 106 ascends and the container 200 is placed back to the growth conveyor 102. The same operations are carried out for containers 200 placed on a different growth conveyor 102.

Consequently, the monitoring person can monitor and cultivate the plants grown in all the containers 200 located in the growing area 301.

It is noted that the present invention shall not be limited to Embodiment 2. For example, any given combination of the constituent elements or omission of some of the constituent elements described in the specification may be appreciated to implement an embodiment of the present invention other than the above described embodiment. In addition, the present invention may include modifications implemented by a person skilled in the art to the embodiments unless otherwise departing from the subject-matter of the present invention; that is the scope of the invention stated with the language in claims.

Figure 13:
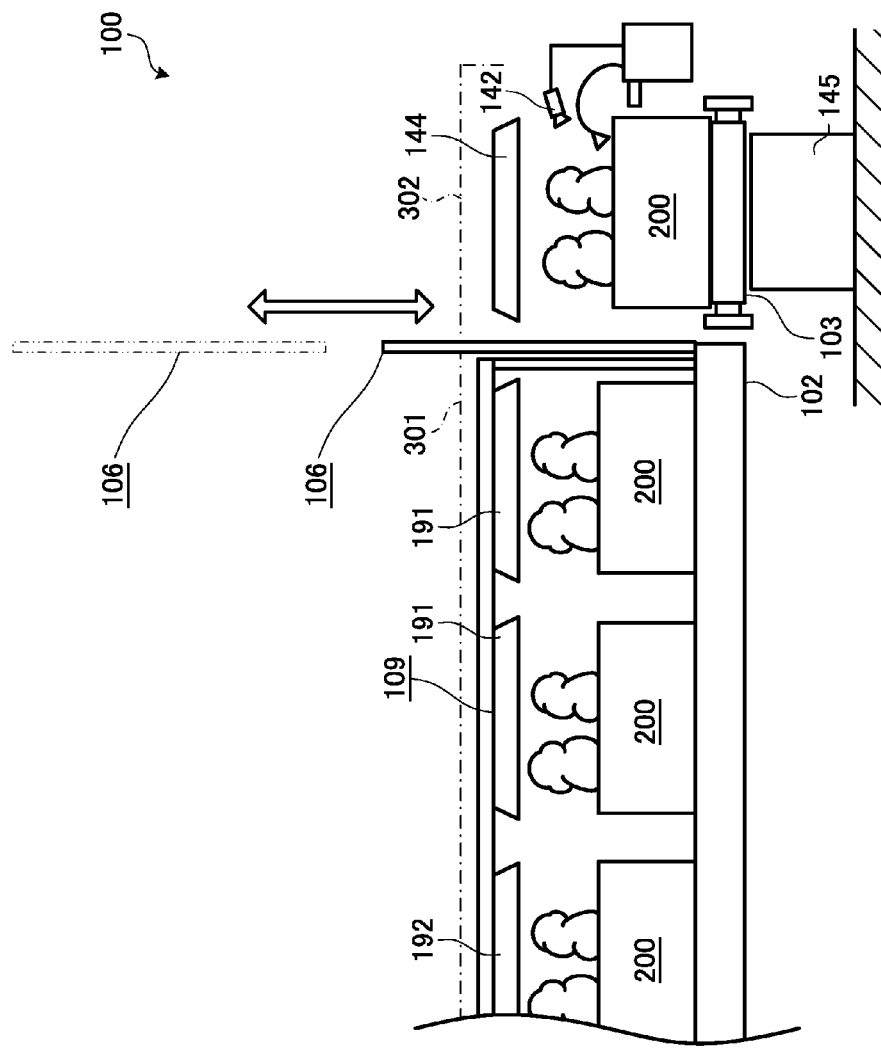
FIG. 13 represents a side view of a part of the cultivation system according to another embodiment.

As represented in FIG. 13, for example, the light blocking unit 106 may open and close the boundary between the growing area 301 and the monitoring area 302. When the boundary is closed (the light blocking unit 106 illustrated by the solid line), the light blocking unit 106 may block the grow light emitted to the monitoring area 302. When the boundary is open (the light blocking unit 106 illustrated by the two-dot chain line), the containers 200 are allowed to move.

Figure 14:
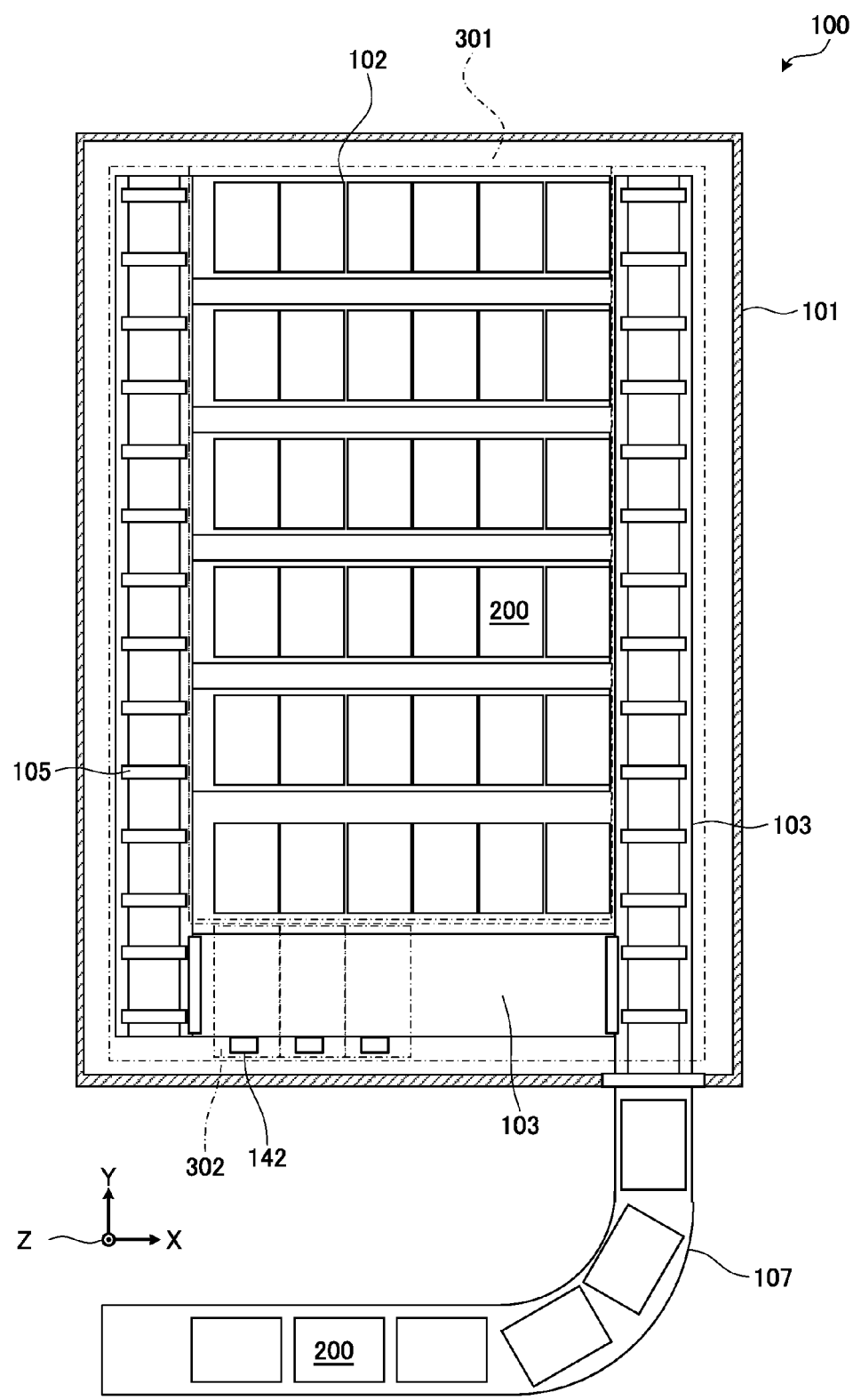
FIG. 14 represents a plan view from the top, illustrating the entire picture of a cultivation system according to another embodiment with a part thereof cut away.

For example, the growth conveyor 102 and the work conveyor 103 may be laid out to shuttle back and forth as represented in FIG. 7 or to circulate as represented in FIG. 14.

Specifically, the work conveyor 103 for a circular cultivation system 100 is connected with the both ends of each of the growth conveyors 102. The work conveyor 103 is provided in a horseshoe shape, and each of the growth conveyors 102 is provided to tie both rows of the work conveyor 103 together. Such a structure allows the growth conveyors 102 and the work conveyor 103 to form a pathway to circulate the containers 200. Hence the cultivation system 100 has as many circulation pathways as the number of the growth conveyors 102 for circulating the containers 200.

The above-described circular cultivation system 100 makes it possible to monitor the plants in all the containers 200 using at least one imaging unit 142 in the monitoring area 302.

Moreover, the containers 200 and the cultivation beds shall not be defined in a specific form. The containers 200 may be made of any given material including plastic, wood, and metal. The cultivation beds held in the containers 200 may be prepared using any given substance such as liquid for water culture, soil for soil culture, or a substitute for soil. In addition, things such as shallow pallets may be included in the containers 200.

Furthermore, the monitoring area 302 and a cultivating area for cultivation may be separately arranged from each other.

Moreover, "light blocking" does not only mean the complete block of grow light. The language "light blocking" includes a leak of the grow light to the extent that a monitoring person can appropriately monitor plants based on images obtained by the imaging unit 142. For example, a portion of the light blocking shield 161 (for example, a portion opposite the growing area 301), may have a transparent window for the monitoring person to see inside the light blocking shield 161.

In addition, the cultivating unit 104 is provided to a side of the imaging unit 142; however, the imaging unit 142 and the cultivating unit 104 may be separately arranged from each other.

Moreover, the imaging unit 142 is fixed; however, the imaging unit 142 may be attached to the light blocking shield 161 to move together with the light blocking shield 161.

Figure 15:
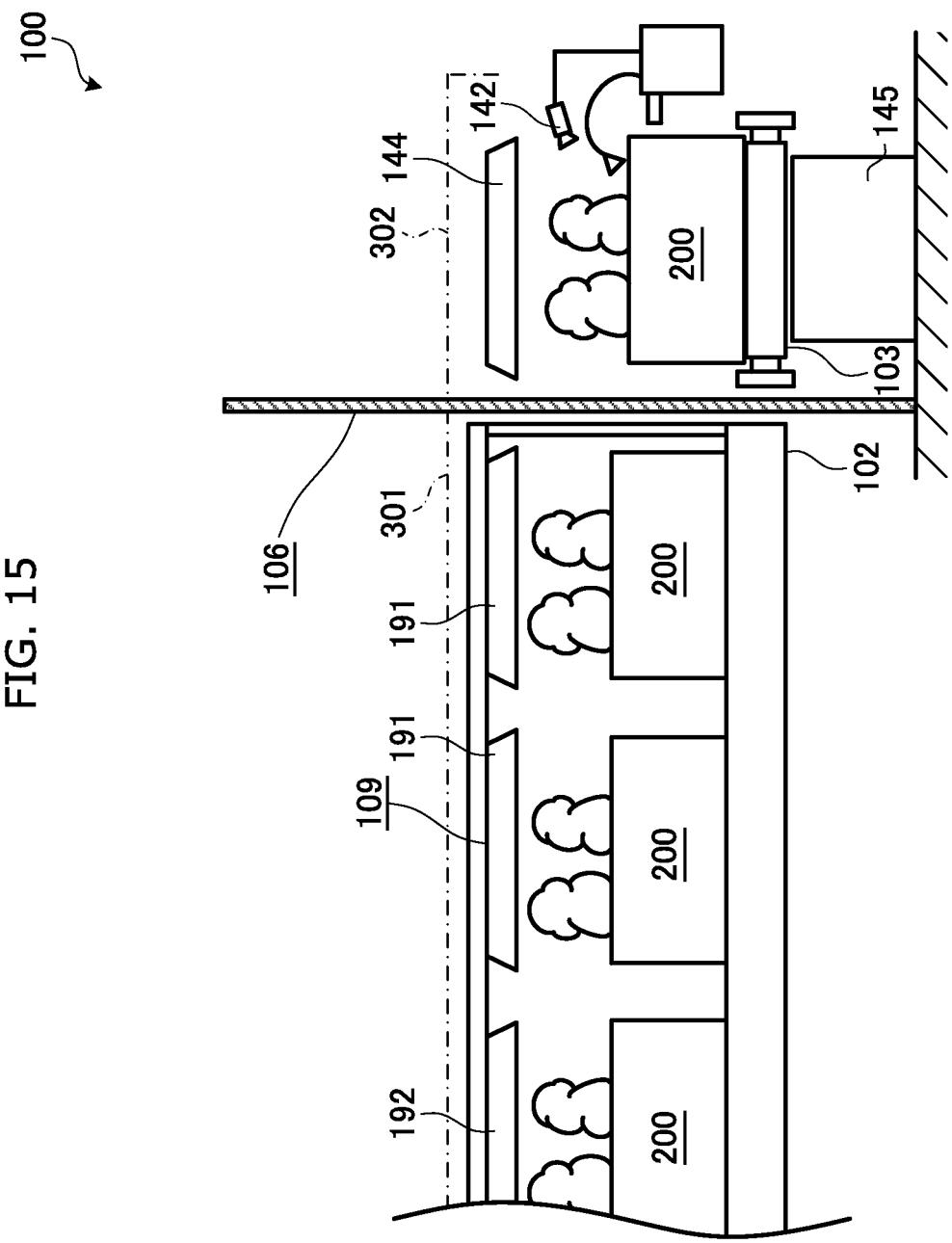
FIG. 15 represents a side view of a part of the cultivation system according to another embodiment.
Figure 16:
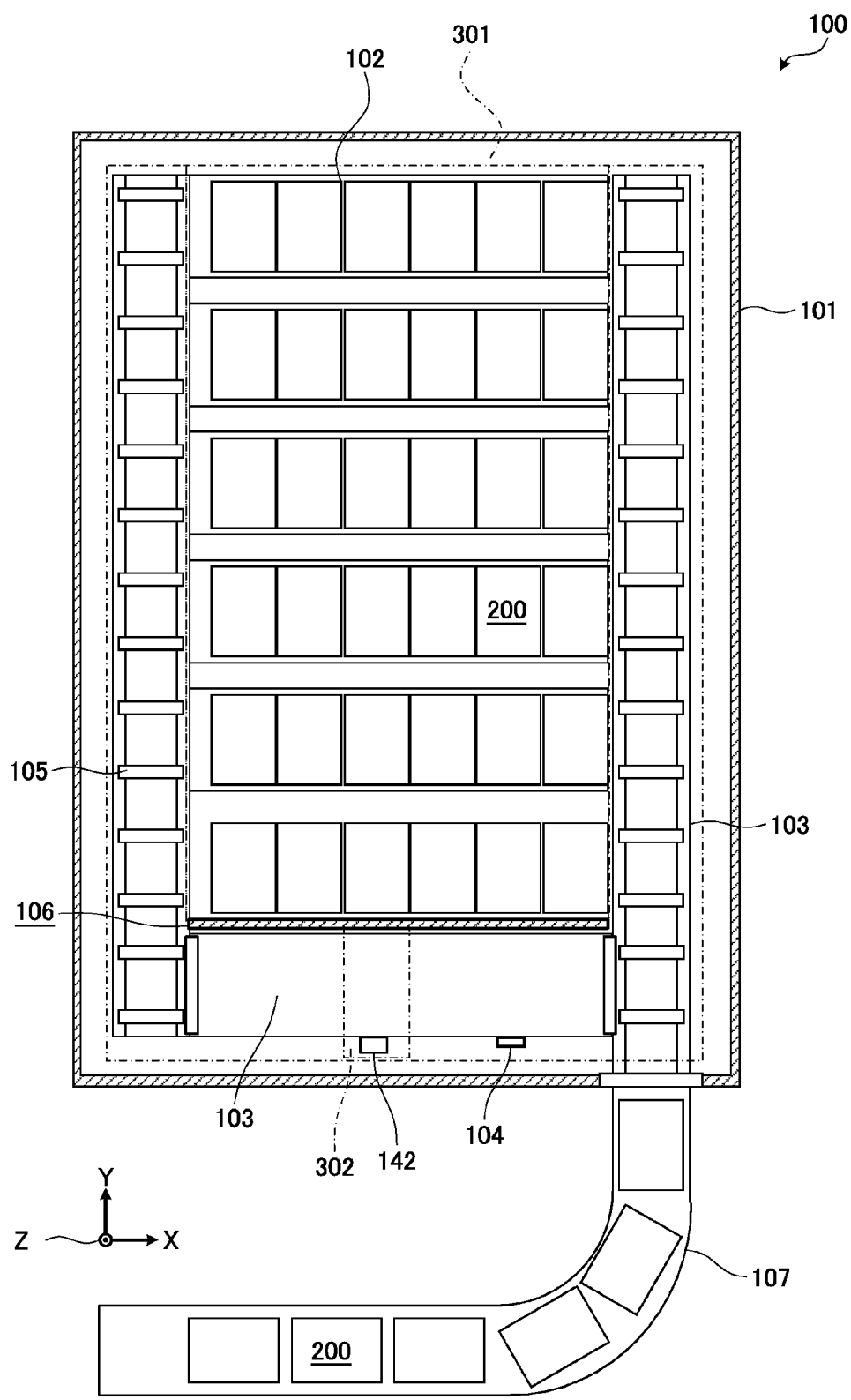
FIG. 16 represents a plan view from the top, illustrating the entire picture of a cultivation system according to another embodiment with a part thereof cut away.

Furthermore, as represented in FIGS. 15 and 16, the light blocking unit 106 in the cultivation system 100 may include a light blocking shield 161 shaped like a wall and fixed between the growing area 301 and the monitoring area 302. Here, in the cultivation system 100, the work conveyor 103 that works as a transporting unit transports a container 200 so that the container 200 is placed at a position where grow light is blocked, when the imaging unit 142 captures the plant. In Embodiment 2, the work conveyor 103 has a pathway to avoid the light blocking shield 161 for transporting a container 200 between the growing area 301 and the monitoring area 302. Hence the work conveyer 103 can provide the containers 200 in the back of the growing area 301 with respect to the light blocking shield 161.

In addition, the present invention may be a plant monitoring method used for a cultivation system which moves multiple containers, holding cultivation beds for cultivating plants, between a growing area and a monitoring area, and includes a grow light emitting unit for emitting grow light which is light for growing the plants located in the growing area. In the plant monitoring method, when the plants located in the monitoring area are captured by an imaging unit, a control unit may control a moving unit which moves a light-light blocking shield so that the moving unit causes the light-light blocking shield to block the grow light emitted to a plant to be captured.

When the imaging unit captures plants, such features make it possible to prevent the grow light, emitted to the growing area, from being emitted to a plant located in the monitoring area. This allows the imaging unit to obtain an accurate color of the plant. Hence the monitoring person can accurately judge the growth degree and a disease of the plant.

In addition, the present invention may be a plant monitoring method used for a cultivation system which moves multiple containers, holding cultivation beds for cultivating plants, between a growing area and a monitoring area, and includes a grow light emitting unit for emitting grow light which is light for growing the plants located in the growing area. In the plant monitoring method, when the plants located in the monitoring area are captured by an imaging unit, the grow light emitting unit stops the emission of the grow light.

When the imaging unit captures plants, such features make it possible to prevent the grow light, emitted to the growing area, from being emitted to a plant located in the monitoring area, which allows the imaging unit to obtain an accurate color of the plant. Hence the monitoring person can accurately judge the growth degree and a disease of the plant.

It is noted that the present invention includes a program for causing a computer to execute each of the processes included in the plant monitoring method. As a matter of course, the present invention includes a storage medium in which the program is stored.

INDUSTRIAL APPLICABILITY

The present invention is useful for cultivating plants including funguses.

REFERENCE SIGNS LIST

100 Cultivation system
101 Building
102 Growth conveyor
103 Work conveyor
104 Cultivating unit
105 Control unit
106 Light blocking unit
107 Carry-in and carry-out conveyor
109 Grow light emitting unit
141 Irradiating system
142 Imaging unit
143 Information obtaining unit
144 Imaging light emitting unit
145 Weight scale
151 Imaging control unit
152 Imaging light emission control unit
153 Grow light emission control unit
154 Conveyor control unit
155 Moving unit control unit
161 Light blocking shield
162 Moving unit
163 Carriage
164 Pillar
169 Insertion hole
171 Communications unit
172 Display unit
173 Input unit
174 Storage unit
191 First grow light emitting unit
192 Second grow light emitting unit
200 Container
301 Growing area
302 Monitoring area

The invention claimed is:

1. A cultivation system which moves containers between a growing area holding the containers and a monitoring area, the containers holding cultivation beds for cultivating plants, the monitoring area being for monitoring the plants and arranged separately from the growing area, the cultivation system comprising:
   a grow light emitting unit configured to emit grow light which is light for growing the cultivated plants in the containers located in the growing area;
   an imaging unit configured to capture the cultivated plants in the containers located in the monitoring area;
   an imaging light emitting unit configured to emit imaging light to the cultivated plants in the containers located in the monitoring area, the imaging light having a first spectrum which differs from a second spectrum output by the grow light;
   a control unit configured to cause the grow light emitting unit to stop emitting a portion of the grow light when the imaging unit captures the cultivated plants, wherein the grow light emitting unit includes:
a first grow light emitting unit configured to emit the grow light to a part of the growing area which is close to the monitoring area; and
a second grow light emitting unit configured to emit the grow light to a part of the growing area which is more distant from the monitoring area than from the first grow light emitting unit,
wherein the first grow light emitting unit is capable of emitting and stopping the grow light independently of the second grow light emitting unit, and
wherein the control unit is configured to cause the first grow light emitting unit to stop emitting the grow light when the imaging unit captures the cultivated plants, and to cause the second grow light emitting unit to emit the grow light when the imaging unit captures the cultivated plants.

2. The cultivation system according to claim 1, wherein the monitoring area is located fixedly relative to the growing area.

3. The cultivation system according to claim 1, wherein the grow light emitting unit includes a light emitting diode (LED) as a light source of the grow light.

4. The cultivation system according to claim 1, further comprising:
a growth conveyor which is located in the growing area, the growth conveyor being capable of carrying and horizontally moving the containers; and
a work conveyor which is located in the monitoring area and connected with an end of the growth conveyor, the work conveyor capable of carrying the containers.

5. The cultivation system according to claim 1, further comprising:
a light blocking unit configured to block the grow light to a part of the growing area which is close to the monitoring area when the imaging unit captures one of the cultivated plants.

6. The cultivation system according to claim 5, wherein the light blocking unit includes:
a light blocking shield which blocks the grow light to the part of the growing area which is close to the monitoring area; and
a moving unit configured to move the light blocking shield;
wherein the control unit is further configured to cause the moving unit to move the light blocking shield to (i) a first position where the light blocking shield blocks the grow light to the part of the growing area which is close to the monitoring area when the imaging unit captures the plant, and (ii) a second position out of a pathway for transporting the containers when the containers are moved.

7. The cultivation system according to claim 5, wherein the light blocking unit includes a light blocking shield which is fixed between the growing area and a light blocking area to block the grow light,
the cultivation system further comprising a transporting unit configured to transport the containers to positions where the light blocking shield blocks the grow light, when the imaging unit captures the cultivated plants.

8. The cultivation system according to claim 5, further comprising:
a growth conveyor which is located in the growing area, the growth conveyor being capable of carrying and horizontally moving the containers; and
a work conveyor which is located in the monitoring area and connected with an end of the growth conveyor, the work conveyor carrying the containers.

9. The cultivation system according to claim 1, wherein:
the second spectrum of the grow light is that of natural sunlight with a specific color component missing or deteriorating.

10. The cultivation system according to claim 1, wherein:
the first spectrum of the imaging light is artificial light close to that of natural sunlight.

* * * * *